US011560030B2

(12) United States Patent
Senoo et al.

(10) Patent No.: US 11,560,030 B2
(45) Date of Patent: Jan. 24, 2023

(54) ARM SUPPORT STRUCTURE

(71) Applicant: ISUZU MOTORS LIMITED, Tokyo (JP)

(72) Inventors: Daisuke Senoo, Fujisawa (JP); Atsushi Itou, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 232 days.

(21) Appl. No.: 16/770,529

(22) PCT Filed: Dec. 7, 2018

(86) PCT No.: PCT/JP2018/045043
§ 371 (c)(1),
(2) Date: Jun. 5, 2020

(87) PCT Pub. No.: WO2019/112029
PCT Pub. Date: Jun. 13, 2019

(65) Prior Publication Data
US 2020/0369107 A1 Nov. 26, 2020

(30) Foreign Application Priority Data
Dec. 8, 2017 (JP) .............................. JP2017-236354

(51) Int. Cl.
*B60G 13/00* (2006.01)
*B62D 17/00* (2006.01)

(52) U.S. Cl.
CPC ...... *B60G 13/003* (2013.01); *B60G 2202/114* (2013.01); *B60G 2204/128* (2013.01); *B60G 2204/4302* (2013.01); *B62D 17/00* (2013.01)

(58) Field of Classification Search
CPC ............ B60G 13/003; B60G 2204/128; B60G 2200/46; B60G 2200/156; B60G 2204/4302; B60G 7/008; B62D 17/00
See application file for complete search history.

(56) References Cited

U.S. PATENT DOCUMENTS 4,695,073 A * 9/1987 Pettibone ............... B62D 17/00
280/86.757
4,736,964 A * 4/1988 Specktor .................. B60G 7/02
280/86.753

(Continued)

FOREIGN PATENT DOCUMENTS

CN 1513715 A 7/2004
CN 104443033 A 3/2015

(Continued)

OTHER PUBLICATIONS

Computer generated English translation of DE 4437661 to Mevissen from Espacenet, generated on May 20, 2022 (Year: 2022).*

(Continued)

*Primary Examiner* — Paul N Dickson
*Assistant Examiner* — Tiffany L Webb
(74) *Attorney, Agent, or Firm* — Procopio, Cory, Hargreaves & Savitch LLP (57) ABSTRACT

This arm support structure is equipped with: a bracket on which base end section of an arm of a suspension device is positioned between a pair of facing walls which face one another at a distance in vehicle chassis front-rear direction; axial support members which axially support the base end section on the bracket, by being inserted into long holes formed to pass through facing walls and through-holes formed to pass through the base end section; eccentric plate members which are formed in a circular shape and capable of integrally rotating with axial support members, and have an engaging hole capable of engaging an axial support member formed to pass therethrough at a location offset in radial direction from the circular center thereof; and a plurality of contact parts which contact the circumferential edge of the eccentric plate members, and rotatably support the eccentric plate members.

2 Claims, 9 Drawing Sheets

(56) References Cited

U.S. PATENT DOCUMENTS

| | | | | |
|---|---|---|---|---|
| 5,052,711 A * | 10/1991 | Pirkey | ................... | B62D 17/00 |
| | | | | 280/86.753 |
| 5,169,171 A | 12/1992 | Ban et al. | | |
| 5,775,719 A * | 7/1998 | Holden | ................. | B62D 17/00 |
| | | | | 280/86.75 |
| 7,661,916 B2 * | 2/2010 | Downey | .............. | F16B 5/0225 |
| | | | | 411/169 |
| 9,233,589 B1 * | 1/2016 | Miller | ..................... | B60G 7/02 |
| 2015/0083514 A1 | 3/2015 | Asano et al. | | |

FOREIGN PATENT DOCUMENTS

| | | |
|---|---|---|
| DE | 4437661 A1 | 4/1996 |
| EP | 0857590 A1 | 2/1998 |
| JP | H04-031184 A | 2/1992 |
| JP | H10-167107 A | 6/1998 |
| JP | H100250332 A | 9/1998 |
| JP | 2009174916 A | 8/2009 |
| JP | 2015-006825 A | 1/2015 |
| WO | 03-086790 A1 | 10/2003 |

OTHER PUBLICATIONS

International Search Report and Written Opinion for related PCT App No. PCT/JP2018/045043 dated Feb. 12, 2019, 8 pgs (partial translation).
Japanese Patent Office, Office Action, Application No. JP 2017-236354, dated Mar. 1, 2022, in 6 pages.
Japanese Patent Office, Notice of Reasons for Refusal, Application No. JP 2017-236354, dated Aug. 24, 2022, in 6 pages.
National Intellectual Property Administration of the People's Republic of China, The First Office Action, Application No. 201880078859.0, dated Oct. 31, 2022, in 15 pages.

* cited by examiner

ARM SUPPORT STRUCTURE

CROSS-REFERENCE TO RELATED APPLICATIONS

This application is a U.S. National Stage entry of PCT Application No: PCT/JP2018/045043 filed Dec. 7, 2018, which claims priority to Japanese Patent Application No. 2017-236354 filed Dec. 8, 2017, the contents of which are incorporated herein by reference.

TECHNICAL FIELD

This application is based on a Japanese Patent Application (Japanese Patent Application No. 2017-236354), filed on Dec. 8, 2017, the contents of which are incorporated herein by reference.

The present disclosure relates to an arm support structure, and more particularly, to a support structure for an upper arm of a suspension device.

BACKGROUND ART

Conventionally, a double wishbone type suspension device that supports wheels by an upper arm and a lower arm has been known as an example of an independent suspension type of wheels. In general, an upper arm of this kind of suspension device is formed into a substantial V-shape or a substantial A-shape having a pair of front and rear base end portions. An upper arm is swingably attached to a side member by inserting a cam bolt into long holes of front and rear brackets fixed to the side member or the like and through-holes of base end portions, and fastening a nut to the cam bolt (see, for example, Patent Literature 1).

CITATION LIST

Patent Literature

Patent Literature 1: JP-A-H10-250332

SUMMARY OF INVENTION

Technical Problem

Incidentally, in the structure described in Patent Literature 1, adjustments of attachment angles and positions of the upper arm with respect to the bracket are performed by pressing a cam plate fitted to the cam bolt against a contact portion protruding from a vicinity of the long hole of the bracket. However, in the structure of this literature, only one contact portion is provided for one long hole. Therefore, a worker needs to reliably press the cam plate against the contact portion with one hand while integrally rotating the cam bolt with the cam plate with the other hand, and the work may be troublesome.

In the structure of this literature, upper portions of the front and rear brackets are blocked by a ceiling plate. Therefore, during the work of inserting the cam bolt, the ceiling plate may interfere with the work, resulting in deterioration in workability.

The present disclosure provides an arm support structure that can effectively improve workability in assembly of an arm.

Solution to Problem

An arm support structure of the present disclosure includes: a bracket that is fixed to a vehicle body and includes a pair of facing walls facing each other at a distance in a front-rear direction of a vehicle body, a base end portion of an arm of a suspension device being disposed between the pair of facing walls; an axial support member that is inserted into a long hole formed in a manner of penetrating the facing wall and a through-hole formed in a manner of penetrating the base end portion, and axially supports the base end portion to the bracket; an eccentric plate member that is formed in a circular shape and can integrally rotate with the axial support member, and is provided with an engaging hole that can engage with the axial support member and is formed in a penetrating manner at a position offset in a radial direction from a circular center thereof; and a plurality of contact portions that contact a peripheral edge of the eccentric plate member and rotatably support the eccentric plate member.

In the arm support structure, the bracket includes a plate-shaped main body portion to be fixed, and at least one contact portion among the plurality of contact portions is formed from a wall surface of the main body portion.

The arm support structure further includes a plate member positioned between the eccentric plate member and an outer wall of the facing wall, in which another contact portion among the plurality of contact portions may be formed by bending an end portion of the plate member.

In the arm support structure, the main body portion extends in the front-rear direction of the vehicle body, the arm integrally includes a front base end portion and a rear base end portion, which are separated from each other at the front-rear direction of the vehicle body, as the base end portion, and the bracket may include a front bracket portion that is provided on a front end side of the main body portion and supports the font base end portion, and a rear bracket portion that is provided on a rear end side of the main body portion and supports the rear base end portion.

In the arm support structure, an intermediate bracket portion that supports a shock absorber may be further provided between the front bracket portion and the rear bracket portion of the main body portion.

Advantageous Effects of Invention

According to the technology of the present disclosure, the workability in assembly of the arm can be effectively improved.

DESCRIPTION OF EMBODIMENTS

The present embodiment will be described below with reference to the accompanying drawings. The same components or configurations are denoted by the same reference numerals, and names and functions thereof are also the same. Therefore, detailed descriptions of the same components are not repeated.

[Overall Configuration of Suspension Device]

Figure 1:
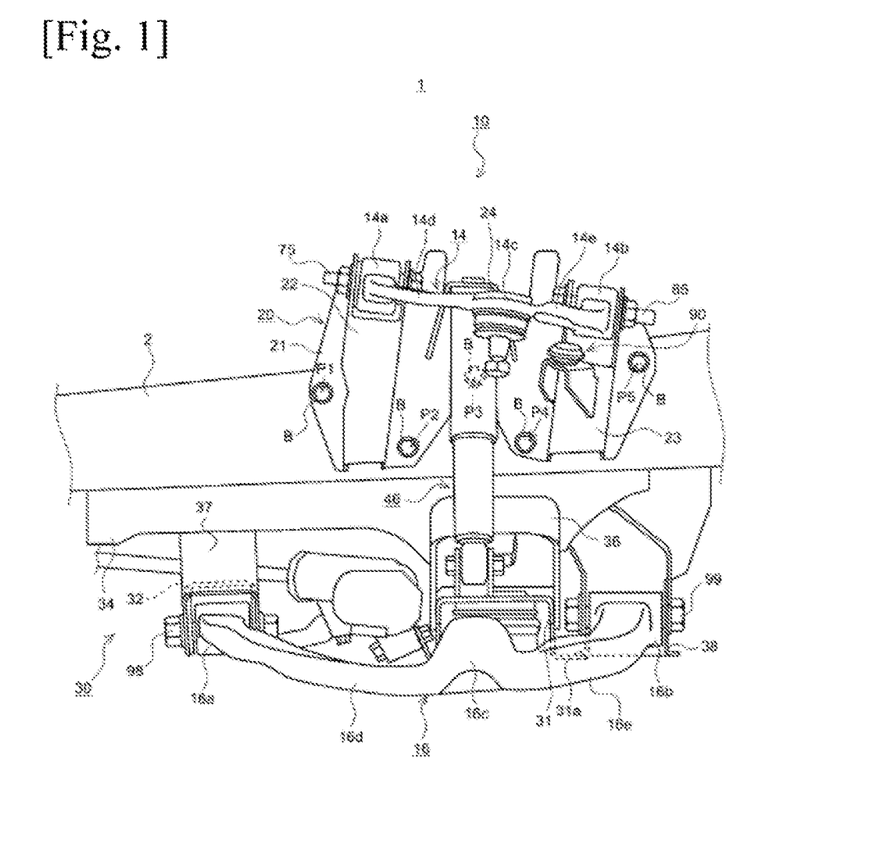
FIG. 1 is a schematic configuration view of a part of a suspension device according to the present embodiment.

FIG. 1 is a schematic side view of a suspension device 10 according to the present embodiment as viewed from a left side of a vehicle body. The suspension device 10 is so-called suspension device of an independent suspension type and is applied to left and right front wheels (not illustrated) of the vehicle 1 in the present embodiment. Specifically, the suspension device 10 includes an upper bracket 20 fixed to a side member 2 that extends in a front-rear direction of a vehicle body (illustration of a right side member is omitted), an upper arm 14 and a lower arm 16 that are swingable with respect to the vehicle body, a lower frame body 30 provided below the side member 2, and a shock absorber 46 as a shock absorbing device. Note that since the suspension device 10 has substantially symmetrical configurations when applied to the left front wheel and the right front wheel, a configuration applied to the left front wheel will be described below, and a description of a configuration applied to the right front wheel will be substantially omitted.

The upper bracket 20 includes a plate-shaped main body portion 21 fixed to a wall surface of the side member 2 on an outer side in a width direction of a vehicle body, a front upper arm bracket portion 22 provided on a front end side of the main body portion 21 in the front-rear direction of the vehicle body, a rear upper arm bracket portion 23 provided on a rear end side of the main body portion 21 in the front-rear direction of the vehicle body, an intermediate bracket portion 24 disposed between the upper arm brackets 22 and 23 of the main body portion 21, and a rebound stopper 90 provided on the rear upper arm bracket portion 23.

In the present embodiment, the upper bracket 20 is preferably configured such that a total five locations are fixed by fastening bolts B to back nuts (not illustrated) of the side member 2, the five locations including a first position P1 of the main body portion 21 more frontward than the front upper arm bracket portion 22, a second position P2 of the main body portion 21 between the front upper arm bracket portion 22 and the intermediate bracket portion 24, a third position P3 of the main body portion 21 more downward than the intermediate bracket portion 24, a fourth position P4 of the main body portion 21 between the intermediate bracket portion 24 and the rear upper arm bracket portion 23, and a fifth position P5 of the main body portion 21 more rearward than the rear upper arm bracket portion 23. A detailed configuration of the upper bracket 20 will be described below.

The upper arm 14 is formed in a substantial V-shape or a substantial A-shape, and includes a pair of front and rear upper arm base end portions 14a and 14b that are spaced apart in the front-rear direction of the vehicle body, an upper arm distal end portion 14c positioned more outward than the front and rear upper arm base end portions 14a and 14b in the width direction of the vehicle body, and a pair of front and rear arm portions 14d and 14e that connect these front and rear upper arm base end portions 14a and 14b to the upper arm distal end portion 14c, respectively. The front and rear upper arm base end portions 14a and 14b are formed in a substantially cylindrical shape, and are swingably and axially supported by the front and rear upper arm bracket portions 22 and 23 via cam bolts 75 and 85. The details of support structures thereof will be described below.

The lower arm 16 is formed in a substantial V-shape or a substantial A-shape, and includes a pair of front and rear lower arm base end portions 16a and 16b that are spaced apart in the front-rear direction of the vehicle body, a lower arm distal end portion 16c positioned more outward than the front and rear lower arm base end portions 16a and 16b in the width direction of the vehicle body, and a pair of front and rear arm portions 16d and 16e that connect these front and rear lower arm base end portions 16a and 16b to the lower arm distal end portion 16c, respectively. The front and rear lower arm base end portions 16a and 16b are formed in a substantially cylindrical shape, and are rotatably and axially supported by front and rear lower arm bracket portions 37 and 38, which will be described below, via bolts 98 and 99.

Figure 2:
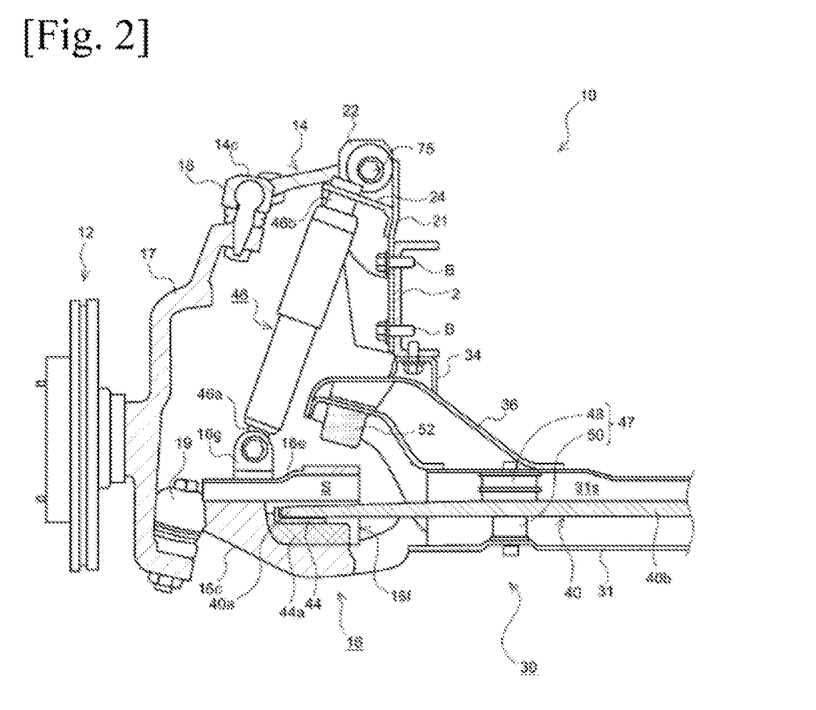
FIG. 2 is a configuration view of the suspension device of FIG. 1 on one wheel side, and is a partial cross-sectional view.

As illustrated in FIG. 2, an upper end portion of a knuckle 17 of a hub of the wheel (not illustrated) or a brake rotor (hereinafter, simply referred to as a hub) 12 is pivotally supported by the upper arm distal end portion 14c of the upper arm 14 via a ball joint 18, and a lower end portion of the knuckle 17 of the hub 12 is pivotally supported by the lower arm distal end portion 16c of the lower arm 16 via a ball joint 19.

Returning to FIG. 1, the lower frame body 30 includes a pair of front and rear main cross members 31 extending substantially parallel to each other in the width direction of the vehicle body, a sub cross member 32, a pair of left and right vertical members 34 extending substantially parallel to each other in the front-rear direction of the vehicle body (illustration of the right vertical member is omitted), and a lower bracket 36. The sub cross member 32 is spaced apart from the main cross member 31 in front of the main cross member 31.

An upper surface of the vertical member 34 is arranged along a lower surface of the side member 2, and the vertical member 34 is joined to the side member 2 by a bolt nut which is not illustrated (or welding, etc.). The vertical member 34 straddles an upper portion of the lower bracket 36. An upper end portion of a front lower arm bracket 37, which will be described below, is joined to a lower surface of the vertical member 34 on a front end side by welding or the like. The sub cross member 32 is coupled to and supported by the vertical member 34 via the front lower arm bracket 37. The lower bracket 36 is joined to a lower surface of the vertical member 34 on a rear end side by welding or the like, and an upper surface portion of the main cross member 31 on an outside in the width direction of the vehicle body is joined to a lower end of the lower bracket 36 by welding or the like. That is, the lower bracket 36 functions as a connection member that connects the vertical member 34 and the main cross member 31.

Further, the lower frame body 30 includes a pair of front and rear lower arm brackets 37 and 38 disposed in the front-rear direction of the vehicle body. The front lower arm base end portion 16a of the lower arm 16 is swingably and axially supported by the front lower arm bracket 37 via the bolt 98. The rear lower arm base end portion 16b of the lower arm 16 is swingably and axially supported by the rear lower arm bracket 38 via the bolt 99. An upper end of the front lower arm bracket 37 is joined to the vertical member 34 by welding or the like, and a lower end portion thereof is provided with a recessed portion that opens downward in a substantial U-shape. The sub cross member 32 is fitted into the recessed portion and fixed thereto by welding or the like. A front end side of the rear lower arm bracket 38 is fixed to an extension portion 31a of the main cross member 31 by welding or the like, and an upper end side thereof is fixed to the vertical member 34 by welding or the like.

As illustrated in FIG. 2, in the suspension device 10 of the present embodiment, a leaf spring 40 is inserted into an inner cavity 31s of the main cross member 31 and is disposed laterally in the width direction of the vehicle body. The leaf spring 40 has a shape that generally extends in the width direction of the vehicle body and is curved to slightly protrude upward in the vertical direction. One end portion 40a of the leaf spring 40 is disposed on a support portion 44 in the lower arm 16 on the hub 12 side that is the left front wheel side, and the other end portion of the leaf spring 40 is similarly disposed on a support portion in the lower arm on the right front wheel side (not illustrated). An intermediate part 40b of the leaf spring 40 is accommodated in the inner cavity 31s of the main cross member 31 and is supported by the main cross member 31 via a bushing member 47.

The support portion 44 is accommodated in a space S defined by the lower arm distal end portion 16c of the lower arm 16 and a lower arm cover portion 16e provided to cover an upper surface of the lower arm distal end portion 16c. An elastic body 44a is provided below the support portion 44. The elastic body 44a has a function of increasing a shock absorbing ability when a large force acts on the support portion 44, or absorbing a difference between a rotation trajectory of the lower arm 16 and a rotation trajectory of the leaf spring 40. The lower arm 16 in which the cover portion 16e is attached to the upper surface of the lower arm distal end portion 16c includes an opening portion 16f that opens inward in the vehicle width direction. The one end portion 40a of the leaf spring 40 extends into the space S through the opening portion 16f and is supported by the support portion 44.

The bushing member 47 includes an upper bushing 48 that is positioned on a vertically upper side of the leaf spring 40 and is connected to an upper inner peripheral surface of the main cross member 31, and a lower bushing 50 that is positioned on a vertically lower side of the leaf spring 40 and is connected to a lower inner peripheral surface of the main cross member 31. The intermediate part 40b of the leaf spring 40 is supported by an inner peripheral surface of the main cross member 31 via a pair of left and right bushing members 47 (illustration of the right bushing member is omitted) disposed in the inner cavity 31s in the width direction of the vehicle body. The leaf spring 40 is pressed against the support portion 44 of the lower arm 16 by the upper bushing 48. The upper bushing 48 can transmit a force from the leaf spring 40 to the lower frame body 30. The lower bushing 50 is provided for the leaf spring 40 so as to function as, for example, a stabilizer. In this way, when the upper bushing 48 and the lower bushing 50 are provided, the leaf spring 40 is curved in a substantial S-shape when forces different in an vertical direction act on left and right front wheels, so that the forces act on both the left and right front wheels, for example.

The shock absorber 46 extends obliquely between the lower arm 16 and the side member 2. A lower end portion 46a of the shock absorber 46 is supported, via a bolt nut or the like, by a support bracket 16g fixed to the upper surface of the lower arm cover portion 16e by welding or the like. An upper end portion 46b of the shock absorber 46 is supported by the intermediate bracket portion 24 of the upper bracket 20.

[Operation and Effects of Overall Suspension Device]

The suspension device 10 described in detail above has a configuration in which the upper bracket 20 to be fixed to a wall surface of the side member 2 on an outer side in the vehicle width direction is independent of the lower frame body 30 to be fixed to a wall surface of the side member 2 on a lower side in the vertical direction of the vehicle body. As a result, the suspension device 10 of the present embodiment can have a high degree of freedom in design.

The suspension device has a configuration in which the upper bracket 20 and the lower frame body 30 are independent of each other, so that the upper bracket 20 and the lower frame body 30 can be assembled with the side member 2 separately, and particularly, the assemblability of the lower frame body 30, among constituent elements of the suspension device 10, to the side member 2 can be improved.

Figure 3:
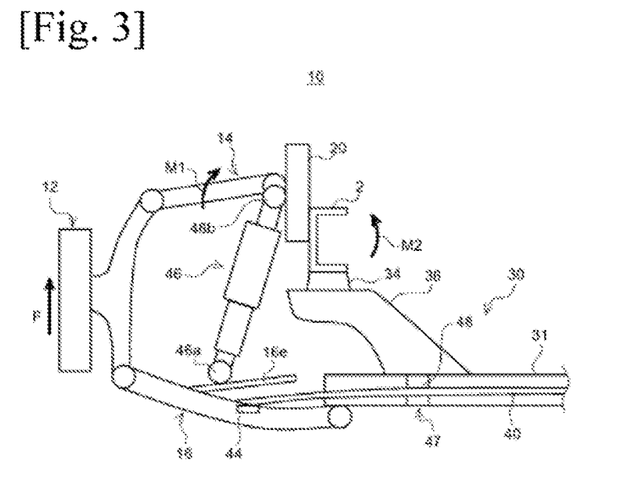
FIG. 3 is a schematic diagram for showing operation and effects of the suspension device of FIG. 1.

The suspension device 10 is also excellent in the strength and the rigidity. Specifically, as shown in FIG. 3, the one end portion 46a of the shock absorber 46 is connected to the lower arm 16, and the other end portion 46b of the shock absorber 46 is connected to the upper bracket 20. A connection portion of the shock absorber 46 to the lower arm 16 is positioned more outward than the upper bracket 20 in the width direction of the vehicle body. Then, the upper bracket 20 is fixed to the wall surface of the side member 2 on the outer side in the width direction of the vehicle body. Therefore, the shock absorber 46 can exert a force to the side member 2 from the outside in the width direction of the vehicle body to the inside (hereinafter, such a force transmission path is referred to as a first transmission route). In addition, a force transmitted from the leaf spring 40 via the upper bushing 48, the main cross member 31, the lower bracket 36, and the vertical member 34 acts on the side member 2 (hereinafter, such a force transmission path is referred to as a second transmission route).

In the suspension device 10, for example, when a force F is applied to lift the hub 12 upward in the vertical direction, a moment M1 of the first transmission route acts on the side member 2. On the other hand, when the force is transmitted from the lower arm 16 to the leaf spring 40, an elastic force of the leaf spring 40 is transmitted to the main cross member 31 via the upper bushing 48. Since the lower bracket 36 is disposed on a lower side of the side member 2 in the vertical direction of the vehicle body, a moment M2 of the second transmission route acts on the side member 2. These moments M1 and M2 act to cancel each other out. Therefore, according to the suspension device 10 of the present embodiment, it is possible to reliably ensure the rigidity with respect to the force F without increasing the thickness of the side member 2, and to effectively prevent a weight increase and a structural change accompanied thereby.

[Upper Bracket]

Figure 4A:
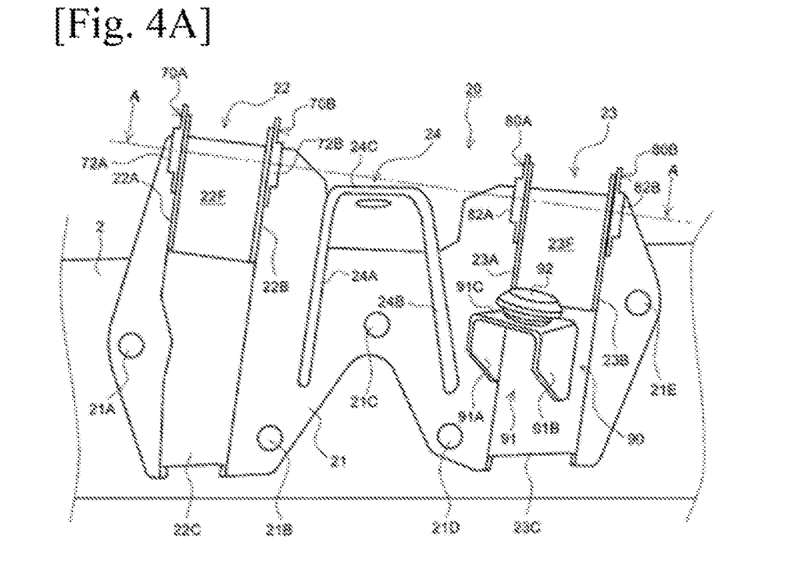
FIG. 4A is a schematic side view illustrating an upper bracket according to the present embodiment.
Figure 4B:
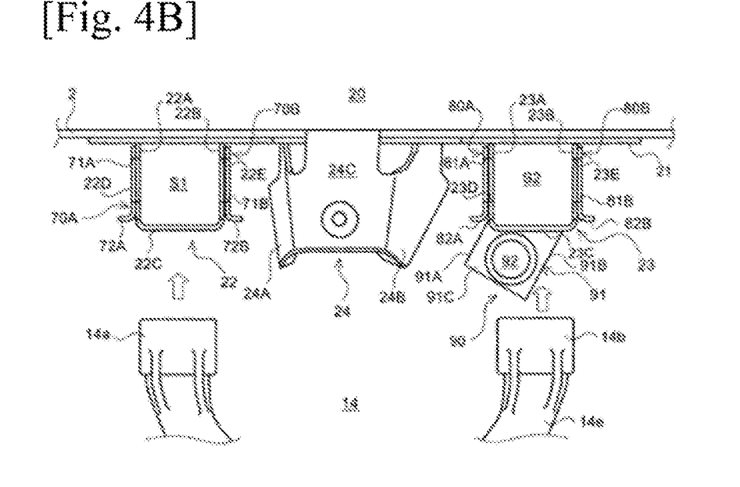
FIG. 4B is a cross-sectional view taken along a line A-A in FIG. 4A.

Next, the details of the upper bracket 20 according to the present embodiment will be described with reference to FIGS. 4A and 4B. FIG. 4A is a schematic side view illustrating the upper bracket 20 according to the present embodiment, and FIG. 4B is a cross-sectional view taken along a line A-A in FIG. 4A. As illustrated in FIGS. 4A and 4B, the upper bracket 20 includes the main body portion 21, the front upper arm bracket portion 22, the rear upper arm bracket portion 23, and the intermediate bracket portion 24.

The main body portion 21 is a plate-shaped member, and has a length in the front-rear direction of the vehicle body, which is formed to be longer than a separation length between the upper arm base end portion 14a of the upper arm 14 and the upper arm base end portion 14b of the upper arm 14 (only illustrated in FIG. 4B). A length in the vertical direction of the vehicle body (a height) of the main body portion 21 is formed to be larger than a length of the side member 2 in the vertical direction of the vehicle body. In the main body portion 21, through-holes 21A, 21B, 21C, 21D, and 21E (only illustrated in FIG. 4A), through which bolts are inserted, are bored at a total five positions of a position more frontward than the front upper arm bracket portion 22, a position between the front upper arm bracket portion 22 and the intermediate bracket portion 24, a position below the intermediate bracket portion 24, a position between the intermediate bracket portion 24 and the rear upper arm bracket portion 23, and a position more rearward than the rear upper arm bracket portion 23, respectively. The main body portion 21 is fixed to the wall surface of the side member 2 on the outer side in the width direction of the vehicle body by inserting bolts (not illustrated) into these through-holes 21A, 21B, 21C, 21D, and 21E, and screwing the bolts with back nuts or the like (not illustrated) of the side member 2.

The front upper arm bracket portion 22 has a cross-sectional shape formed in a substantial U-shape that opens inward in the width direction of the vehicle body, and is provided on a front end side of the main body portion 21 in the front-rear direction of the vehicle body. Specifically, the front upper arm bracket portion 22 includes a pair of front and rear first and second facing wall portions 22A and 22B that extend in the width direction of the vehicle body and face each other at a distance in the front-rear direction of the vehicle body, and a first outer wall portion 22C that connects outer end edges of the facing wall portions 22A and 22B on the outer side in the width direction of the vehicle body.

First and second long holes 22D and 22E (only illustrated in FIG. 4B), which extend with a predetermined length in the width direction of the vehicle body, are formed in a manner of respectively penetrating upper end sides of the first and second facing wall portions 22A and 22B. The front upper arm base end portion 14a of the upper arm 14 (only illustrated in FIG. 4B) is to be inserted between the facing wall portions 22A and 22B. In addition, a pair of front and rear first and second contact plates 70A and 70B are respectively fixed to peripheries of the long holes 22D and 22E on outer wall surfaces of the first and second facing wall portions 22A and 22B by welding or the like. Long holes 71A and 71B (only illustrated in FIG. 4B) having the same shape as the long holes 22D and 22E are formed in a manner of respectively penetrating the first and second contact plates 70A and 70B. Contact flange portions 72A and 72B, which are formed by bending end portions of the contact plates 70A and 70B substantially at right angles in the front-rear direction of the vehicle body, are respectively provided at outer end portions of the first and second contact plates 70A and 70B in the width direction of the vehicle body. The contact flange portions 72A and 72B face wall surfaces of the main body portion 21 on the outer side in the width direction of the vehicle body.

A length in the vertical direction of the vehicle body (a height) of the first outer wall portion 22C is formed to be smaller than a length in the vertical direction of the vehicle body (a height) of the first and second facing wall portions 22A and 22B. That is, between the first and second facing wall portions 22A and 22B above an upper end of the first outer wall portion 22C, an opening portion 22F (only illustrated in FIG. 4A), which opens outward in the width direction of the vehicle body and into which the upper arm 14 is inserted, is formed as a notch.

The front upper arm bracket portion 22 is fixed by joining end edges of the first and second facing wall portions 22A and 22B on the inner side in the width direction of the vehicle body to a side wall surface of the main body portion 21 on the outer side in the width direction of the vehicle body by welding or the like. That is, a closed cross-section space S1 (only illustrated in FIG. 4B) is defined and formed from an inner peripheral surface of the front upper arm bracket portion 22 and the side wall surfaces of the main body portion 21. In this way, the closed cross-section is formed from the front upper arm bracket portion 22, so that the strength and the rigidity of the upper bracket 20 are improved, and the strength and the rigidity of the side member 2 are further improved.

The rear upper arm bracket portion 23 has a cross-sectional shape formed in a substantial U-shape that opens inward in the width direction of the vehicle body, and is provided on a rear end side of the main body portion 21 in the front-rear direction of the vehicle body. Specifically, the rear upper arm bracket portion 23 includes a pair of front and rear third and fourth facing wall portions 23A and 23B that extend in the width direction of the vehicle body and face each other at a distance in the front-rear direction of the vehicle body, and a second outer wall portion 23C that connects end edges of the facing wall portions 23A and 23B on the outer side in the width direction of the vehicle body.

First and second long holes 23D and 23E (only illustrated in FIG. 4B), which extend with a predetermined length in the width direction of the vehicle body, are formed in a manner of respectively penetrating upper end sides of the third and fourth facing wall portions 23A and 23B. The rear upper arm base end portion 14b of the upper arm 14 (only illustrated in FIG. 4B) is to be inserted between the facing wall portions 23A and 23B. In addition, a pair of front and rear third and fourth contact plates 80A and 80B are respectively fixed to peripheries of the long holes 23D and 23E on outer wall surfaces of the third and fourth facing wall portions 23A and 23B by welding or the like. Long holes 81A and 81B (only illustrated in FIG. 4B) having the same shape as the long holes 23D and 23E are formed in a manner of respectively penetrating the third and fourth contact plates 80A and 80B. Contact flange portions 82A and 82B, which are formed by bending end portions of the contact plates 80A and 80B substantially at right angles in the front-rear direction of the vehicle body, are respectively provided at outer end portions of the third and fourth contact plates 80A and 80B in the width direction of the vehicle body. The contact flange portions 82A and 82B face wall surfaces of the main body portion 21 on the outer side in the width direction of the vehicle body.

A length in the vertical direction of the vehicle body (a height) of the second outer wall portion 23C is formed to be smaller than a length in the vertical direction of the vehicle body (a height) of the third and fourth facing wall portions 23A and 23B. That is, between the third and fourth facing wall portions 23A and 23B above an upper end of the second outer wall portion 23C, an opening portion 23F (only illustrated in FIG. 4A), which opens outward in the width direction of the vehicle body and into which the upper arm 14 is inserted, is formed as a notch.

The rear upper arm bracket portion 23 is fixed by joining end edges of the third and fourth facing wall portions 23A and 23B on the inner side in the width direction of the vehicle body to the side wall surface of the main body portion 21 on the outer side in the width direction of the vehicle body by welding or the like. That is, a closed cross-section space S2 (only illustrated in FIG. 4B) is defined and formed from an inner peripheral surface of the rear upper arm bracket portion 23 and the side wall surfaces of the main body portion 21. In this way, the rear upper arm bracket portion 23 is formed into a closed cross-section structure, so that the strength and the rigidity of the upper bracket 20 are improved, and the strength and the rigidity of the side member 2 are further improved.

In the present embodiment, the rear upper arm bracket portion 23 is provided with the rebound stopper 90. The rebound stopper 90 absorbs a shock by contacting a lower surface of the arm portion 14e when the arm portion 14e (both see FIG. 4B) is greatly lowered due to the swing of the upper arm 14. Specifically, the rebound stopper 90 includes a rebound bracket 91, and an absorber 92 formed of an elastic body or the like that functions as a shock absorbing material. The rebound bracket 91 integrally includes a pair of side wall portions 91A and 91B joined to the second outer wall portion 23C by welding or the like, and a top surface portion 91C which connects upper portions of the side wall portions 91A and 91B and to which the absorber 92 is fixed. In this way, when the rebound stopper 90 is provided on the outer wall surface of the rear upper arm bracket portion 23 protruding more outward than the side member 2 in the width direction of the vehicle body, a support point of the rebound stopper 90 can be effectively brought close to a contact point of the arm portion 14e.

The intermediate bracket portion 24 is formed in a substantial U-shape opening downward in a lateral view, and is provided between the front upper arm bracket portion 22 of the main body portion 21 and the rear upper arm bracket portion 23 thereof. Specifically, the intermediate bracket portion 24 includes a pair of front and rear fifth and sixth facing wall portions 24A and 24B that extend in the width direction of the vehicle body and face each other at a distance in the front-rear direction of the vehicle body, and an upper wall portion 24C that connects upper end edges of the facing wall portions 24A and 24B to each other.

The fifth and sixth facing wall portions 24A and 24B are inclined so as to be away from each other when going downward. The upper end portion 46b of the shock absorber 46 (both see FIG. 2) is supported by the upper wall portion 24C.

The intermediate bracket portion 24 is fixed by joining end edges of the fifth and sixth facing wall portions 24A and 24B on the inner side in the width direction of the vehicle body to a side wall of the main body portion 21 on the outer side in the width direction of the vehicle body by welding or the like, and further, joining an end edge of the upper wall portion 24C on the inner side in the width direction of the vehicle body to an upper end edge of the main body portion 21 by welding or the like. In this way, when the intermediate bracket portion 24 is provided between the front upper arm bracket portion 22 of the main body portion 21 and the rear upper arm bracket portion 23 thereof, the strength and the rigidity of the upper bracket 20 are improved, and the strength and the rigidity of the side member 2 are further improved. Further, when the intermediate bracket portion 24 for supporting the shock absorber 46 is integrally provided with the upper arm bracket portions 22 and 23 on the main body portion 21, the shock absorber 46 and the upper arm 14 can be attached to the side member 2 in a state where they are sub-assembled on the upper bracket 20, and the assembly workability and the work efficiency can be improved.

[Support Structure for Upper Arm]

Next, a support structure for the upper arm 14 according to the present embodiment will be described in detail with reference to FIGS. 5 to 7.

Figure 5:
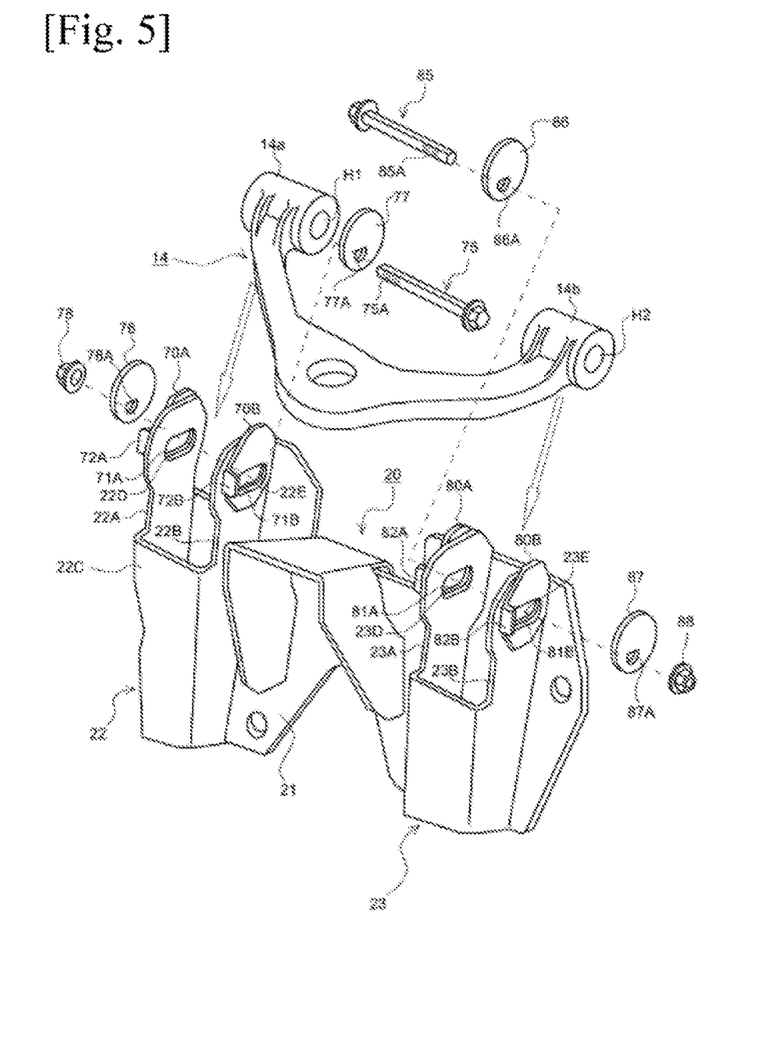
FIG. 5 is an exploded perspective view illustrating a procedure of assembling an upper arm according to the present embodiment with the upper bracket.

FIG. 5 is an exploded perspective view illustrating a procedure of assembling the upper arm 14 with the upper bracket 20. As illustrated in FIG. 5, a shaft portion of a front cam bolt 75 is inserted into the long holes 22D, 22E, 71A, and 71B, and a through-hole H1 of the upper arm base end portion 14a from the second facing wall portion 22B side (a gap between the front upper arm bracket portion 22 and the rear upper arm bracket portion 23). In addition, a shaft portion of a rear cam bolt 85 is inserted into the long holes 23D, 23E, 81A, and 81B, and a through-hole H2 of the upper arm base end portion 14b from the third facing wall portion 23A side (a gap between the front upper arm bracket portion 22 and the rear upper arm bracket portion 23). Note that insertion directions of the cam bolts 75 and 85 may be opposite to each other.

A second eccentric cam plate 77 to be seated on the second contact plate 70B is press-fitted and fixed to a base end of the shaft portion of the front cam bolt 75 in advance. A first eccentric cam plate 76 to be seated on the first contact plate 70A is fitted to a distal end of the shaft portion of the cam bolt 75. The first eccentric cam plate 76 is fitted after the cam bolt 75 is inserted into the long holes 22D, 22E, 71A, and 71B, and the through-hole H. A front cam nut 78 is screwed to a female thread portion 75A formed on a distal end portion of the cam bolt 75. The cam nut 78 is fastened by a tool or the like after adjusting an attachment angle and a position of the upper arm base end portion 14a to be described below.

A third eccentric cam plate 86 to be seated on the third contact plate 80A is press-fitted and fixed to a base end of the shaft portion of the rear cam bolt 85 in advance. A fourth eccentric cam plate 87 to be seated on the fourth contact plate 80B is fitted to a distal end of the shaft portion of the cam bolt 85. The fourth eccentric cam plate 87 is fitted after the cam bolt 85 is inserted into the long holes 23D, 23E, 81A, and 81B, and the through-hole H2. A rear cam nut 88 is screwed to a female thread portion 85A formed on a distal end portion of the cam bolt 85. The cam nut 88 is fastened by a tool or the like after adjusting an attachment angle and a position of the upper arm base end portion 14b to be described below.

The eccentric cam plates 76, 77, 86, and 87 are formed in a substantially perfect circular shape, and engaging holes 76A, 77A, 86A, and 87A are respectively formed in a penetrating manner at positions offset in a radial direction from circular centers thereof. In the present embodiment, cross-sectional shapes of shaft portions of the cam bolts 75 and 85 are formed in a semicircular arc shape including a linear portion by cutting out a part of an outer periphery thereof in a planar shape, and hole shapes of the engaging holes 76A, 77A, 86A, and 87A are also formed in a semicircular arc shape similarly. That is, when the shaft portion of the cam bolt 75 is inserted into the engaging holes 76A and 77A and the shaft portion of the cam bolt 85 is inserted into the engaging holes 86A and 87A, the linear portion of the cam bolt 75 is engaged with the linear portions of the engaging holes 76A and 77A, and the linear portion of the cam bolt 85 is engaged with the linear portions of the engaging holes 86A and 87A. As a result, when the cam bolts 75 and 85 are rotated during adjustment of angles and positions of the upper arm base end portions 14a and 14b, the eccentric cam plates 76, 77, 86, and 87 integrally rotate with the cam bolts 75 and 85. The shapes of the shaft portions of the cam bolts 75 and 85 and the shapes of the engaging holes 76A, 77A, 86A, and 87A are not limited to the illustrated examples, and other shapes such as a recessed shape and a protruding shape may be applied as long as the shaft portions of the cam bolts can be engaged with the engaging holes.

Figure 6:
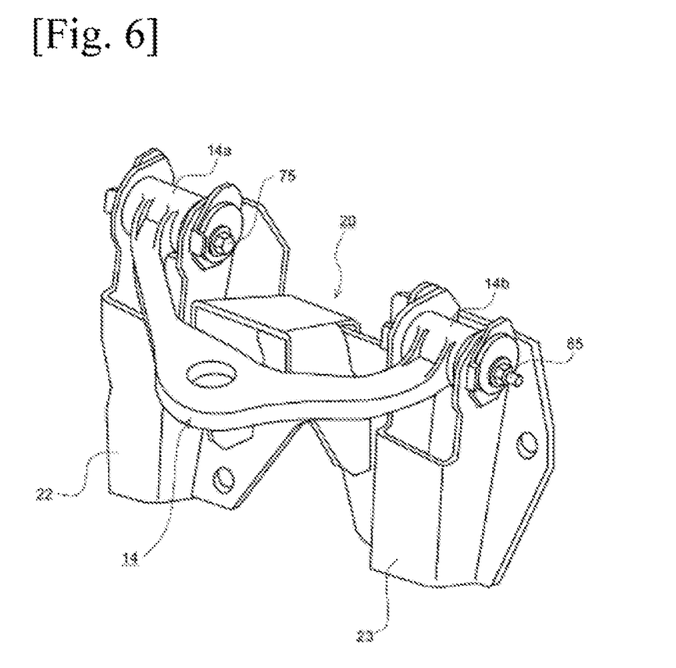
FIG. 6 is a schematic perspective view illustrating a state where the upper arm according to the present embodiment is assembled with the upper bracket.

According to the procedure described above, when the cam bolts 75 and 85 are inserted into the holes and the cam nuts 78 and 88 are screwed, the base end portions 14a and 14b of the upper arm 14 are finally swingably assembled with the front and rear upper arm bracket portions 22 and 23 via the cam bolts 75 and 85, respectively, as illustrated in FIG. 6.

Next, details of the work of adjusting attachment angles and positions of the upper arm 14 using the eccentric cam plates 76, 77, 86, and 87 will be described with reference to FIG. 7. Since the eccentric cam plates 76, 77, 86, and 87 have substantially the same configuration, the second eccentric cam plate 77 used for the front upper arm bracket portion 22 will be described below, and substantial descriptions of the other eccentric cam plates 76, 86, and 87 will be omitted.

Figure 7A:
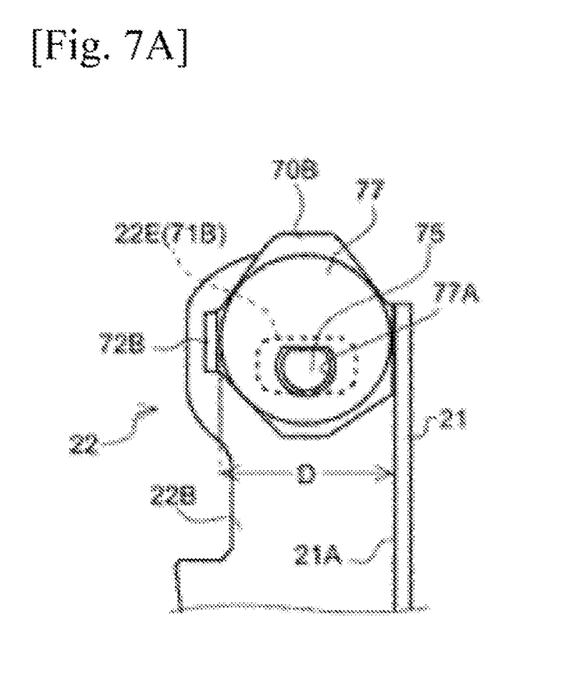
FIG. 7A is a schematic diagram showing work of adjusting an attachment angle and a position of the upper arm using an eccentric cam plate according to the present embodiment.
Figure 7B:
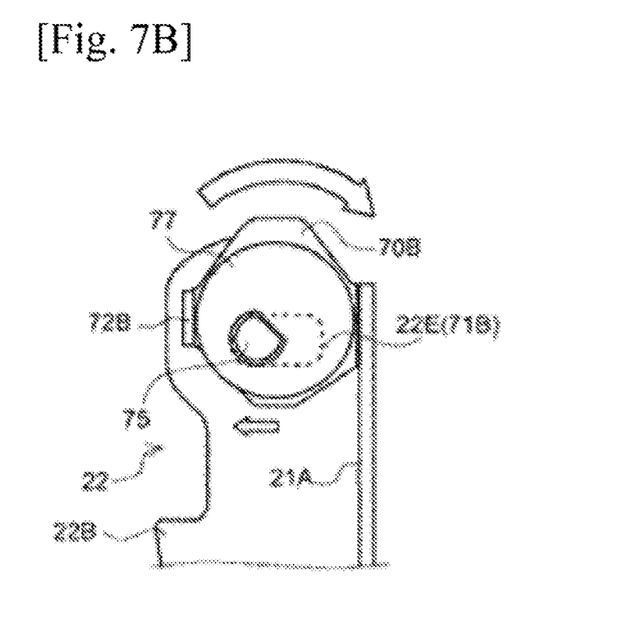
FIG. 7B is a schematic diagram showing the work of adjusting an attachment angle and a position of the upper arm using the eccentric cam plate according to the present embodiment, and is a diagram showing a rotated state.

As shown in FIG. 7A, in the present embodiment, a diameter D of the eccentric cam plate 77 is a length that is substantially equal to a separation distance between a contact flange portion 72B of the contact plate 70B and the wall surface 21A of the main body portion 21 on an outer side in the width direction of the vehicle body, which face each other. That is, when the eccentric cam plate 77 is seated on the contact plate 70B, two locations in the width direction of the vehicle body, which sandwich a center of a circle, in a peripheral edge of the eccentric cam plate 77 are supported by the contact flange portion 72B and the wall surface 21A in a contact state therewith. As a result, as shown in FIG. 7B, when the cam bolt 75 is rotated integrally with the eccentric cam plate 77, two locations of a peripheral edge of the eccentric cam plate 77 are reliably supported by the contact flange portion 72B and the wall surface 21A in a normal contact state, and the cam bolt 75 can be moved to a desired attachment position along the long holes 22E and 71B.

That is, according to the present embodiment, the worker can adjust the attachment angle and the position of the upper arm 14 with respect to the upper arm bracket portions 22 and 23 while rotating the cam bolts 75 and 85 with one hand, and the workability can be reliably improved compared with a structure without a contact portion or with only one contact portion. In addition, upper portions of gaps of the upper arm bracket portions 22 and 23 into which the cam bolts 75 and 85 are respectively inserted are open, so that the worker can easily insert the cam bolts 75 and 85 to the gaps of these upper arm bracket portions 22 and 23.

[Others]

The present disclosure is not limited to the above described embodiment and can be appropriately modified and implemented without departing from the spirit of the present disclosure.

For example, the rebound stopper 90 is provided on the rear upper arm bracket portion 23 as described above, but the rebound stopper 90 may be provided on the front upper arm bracket portion 22, or may be provided on each of the front and rear upper arm bracket portions 22 and 23.

Further, the eccentric cam plates 76, 77, 86, and 87 are provided on both the base ends of the shaft portions and distal ends of the shaft portions of the cam bolts 75 and 85 as described above, but the eccentric cam plates 76, 77, 86, and 87 may be provided on only one of the base end of the shaft portion and the distal end of the shaft portion.

INDUSTRIAL APPLICABILITY

According to the technology of the present disclosure, the workability of assembling an arm can be effectively improved.

REFERENCE SIGNS LIST

2 Side member
10 Suspension device
14 Upper arm
14a, 14b Upper arm base end portion
20 Upper bracket
21 Main body portion
22 Front upper arm bracket portion
22A First facing wall portion
22B Second facing wall portion
22C First outer wall portion
23 Rear upper arm bracket portion
23A Third facing wall portion
23B Fourth facing wall portion
23C Second outer wall portion
24 Intermediate bracket portion
70A First contact plate
72A Contact flange portion
70B Second contact plate
72B Contact flange portion
75 Cam bolt
76 First eccentric cam plate
77 Second eccentric cam plate
78 Cam nut
80A Third contact plate
82A Contact flange portion
80B Fourth contact plate
82B Contact flange portion
85 Cam bolt
86 Third eccentric cam plate
87 Fourth eccentric cam plate
88 Cam nut
90 Rebound stopper

The invention claimed is:

1. An arm support structure, comprising:
a bracket that is fixed to a vehicle body and includes a pair of facing walls facing each other at a distance in a front-rear direction of a vehicle body, a base end portion of an arm of a suspension device being disposed between the pair of facing walls;
an axial support member that is inserted into a long hole formed in a manner of penetrating the facing wall and a through-hole formed in a manner of penetrating the base end portion, and axially supports the base end portion to the bracket;
an eccentric plate member that is formed in a circular shape and integrally rotated with the axial support member, and is provided with an engaging hole that is configured to engage with the axial support member and is formed in a penetrating manner at a position offset in a radial direction from a circular center thereof; and
a plurality of contact portions that contact a peripheral edge of the eccentric plate member and rotatably support the eccentric plate member,
wherein the arm integrally includes a front base end portion and a rear base end portion, which are spaced apart from each other at the front-rear direction of the vehicle body, as the base end portions, wherein the bracket includes:

a plate-shaped main body portion that is fixed to the vehicle body and formed to have a length, in the front-rear direction of the vehicle body, which is longer than a separation length between the front base end portion and the rear base end portion;

a front bracket portion that is formed in a U-shape, provided on a front end side of the main body portion, and configured to support the front base end portion, the front bracket portion including a first outer wall, which is non-horizontal, that connects end edges of the facing walls on an outer side in a width direction of the vehicle body;

a rear bracket portion that is formed in a U-shape, provided on a rear end side of the main body portion, and configured to support the rear base end portion, the rear bracket portion including a second outer wall that connects end edges of the facing walls on an outer side in a width direction of the vehicle body; and an intermediate bracket portion that is configured to support a shock absorber and provided between the front bracket portion of the main body portion and the rear bracket portion of the main body, and wherein the intermediate bracket portion is provided on the main body, integrally with the front bracket portion and the rear bracket portion.

2. The arm support structure according to claim 1, wherein at least one contact portion among the plurality of contact portions is formed from a wall surface of the main body portion.

* * * * *